June 19, 1962   N. C. STULL   3,039,785
STEERING MECHANISM
Filed April 13, 1961   2 Sheets-Sheet 1
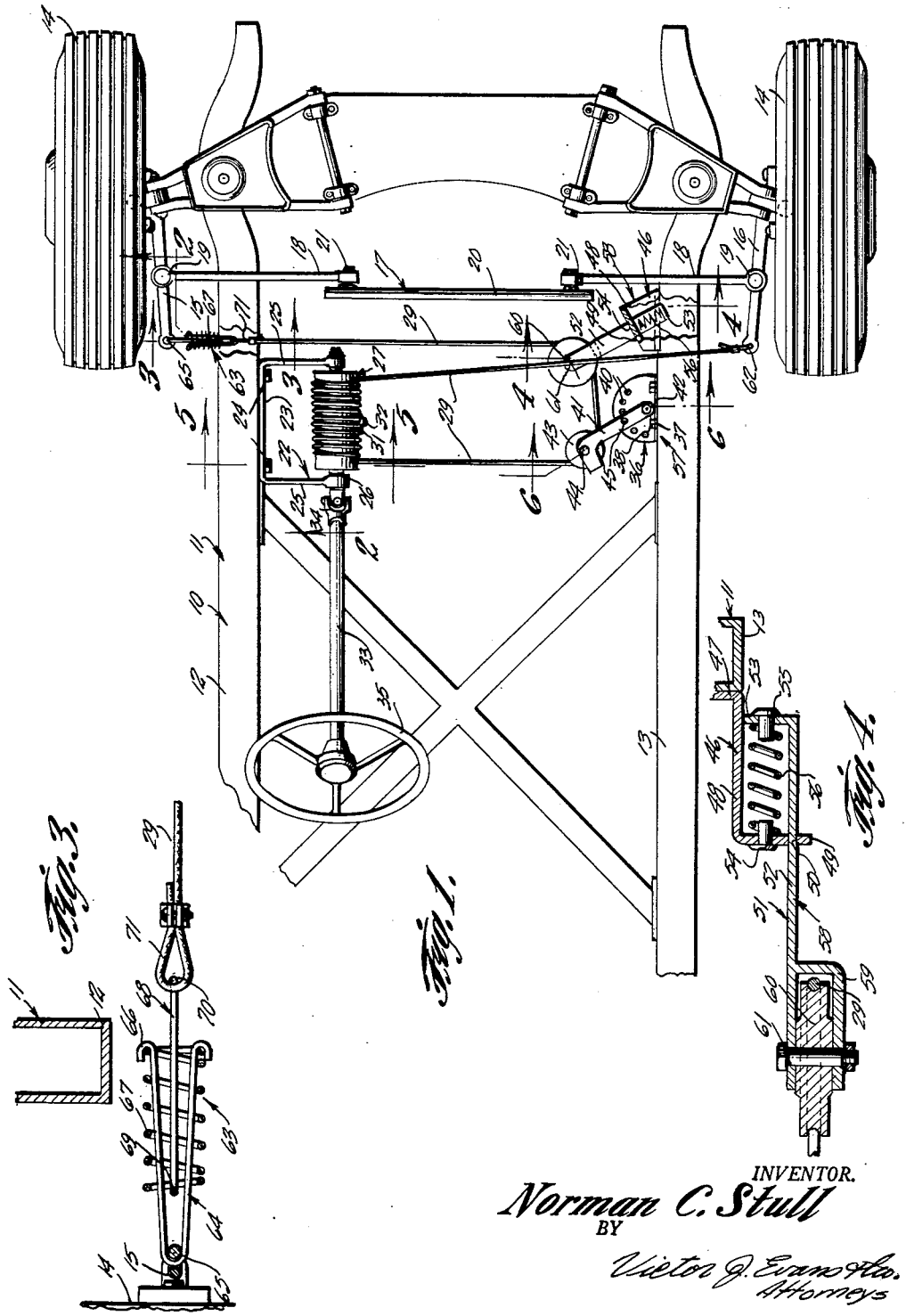
INVENTOR.
Norman C. Stull
BY
Victor J. Evans & Co.
Attorneys

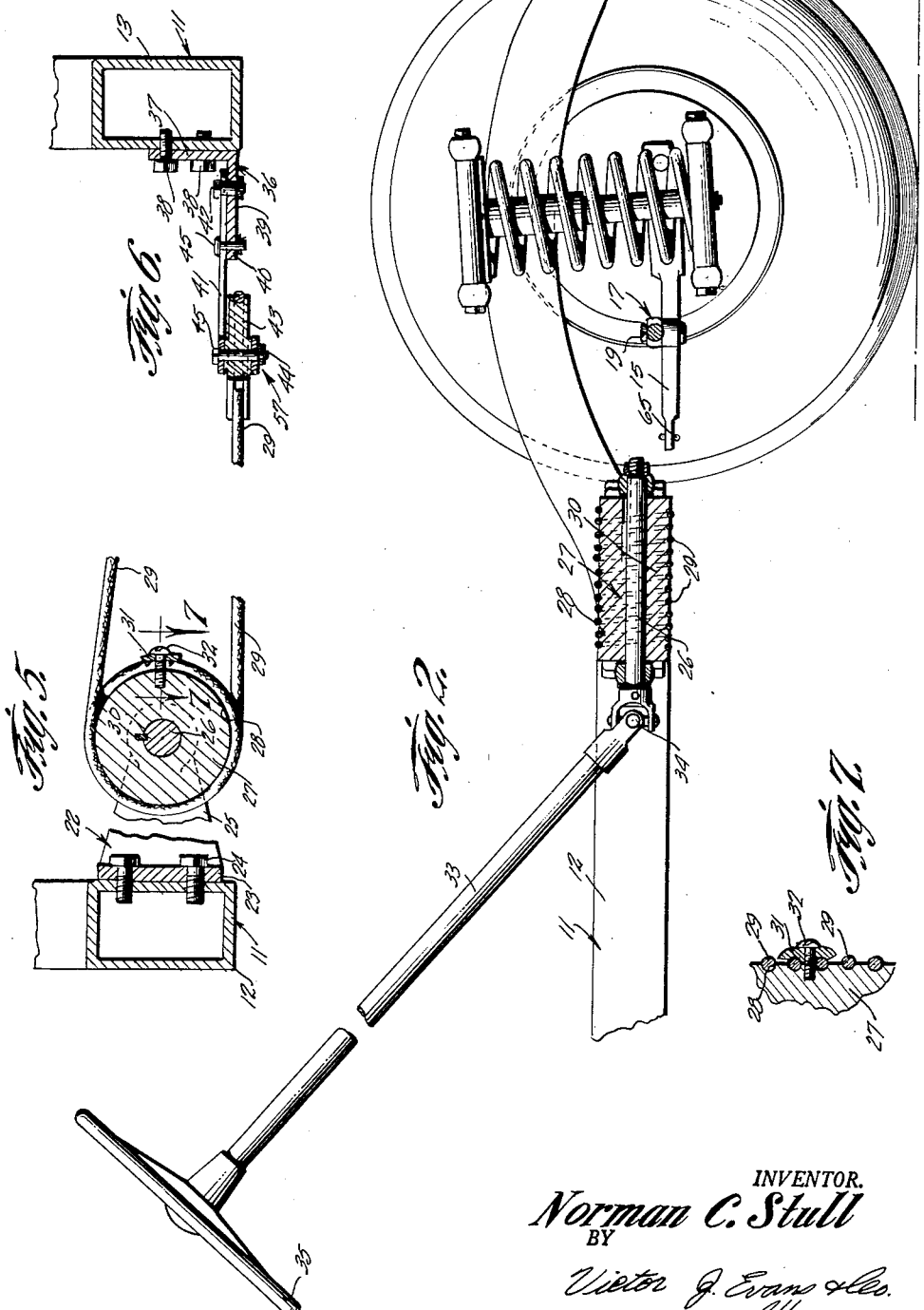

United States Patent Office 3,039,785
Patented June 19, 1962

3,039,785
STEERING MECHANISM
Norman C. Stull, Johnsonville, Ill.
Filed Apr. 13, 1961, Ser. No. 102,872
1 Claim. (Cl. 280—95)

The present invention relates to a steering mechanism or control mechanism, and more particularly to a steering mechanism for a vehicle such as an automobile, truck or the like.

The primary object of the present invention is to provide a steering mechanism which is especially suitable for use with a vehicle wherein there is provided a cable and pulley or sheave mechanism so that as the steering wheel is turned, the front wheels of the vehicle will be simultaneously turned in order to properly steer or guide the vehicle.

Another object is to provide a steering mechanism for a vehicle or the like, wherein there is provided a sheave with a cable thereon, and wherein the sheave is adapted to be rotated by means of the usual vehicle steering wheel, and wherein the cable on the sheave is operatively connected to the reach arms of the front wheels in order to turn the front wheels as the steering wheel is manually turned, and wherein there is provided a means for regulating or maintaining the proper tension on the actuating cable so as to insure that the steering mechanism will properly function or operate.

A further object is to provide a steering mechanism of the type stated that is rugged in structure and foolproof in operation and which is efficient in use and economical to manufacture.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a fragmentary top plan view illustrating schematically the steering mechanism of the present invention mounted on a conventional vehicle such as an automobile or the like.

FIGURE 2 is a sectional view taken on the line 2—2 of FIGURE 1.

FIGURE 3 is a sectional view taken on the line 3—3 of FIGURE 1.

FIGURE 4 is a sectional view taken on the line 4—4 of FIGURE 1.

FIGURE 5 is a sectional view taken on the line 5—5 of FIGURE 1.

FIGURE 6 is a sectional view taken on the line 6—6 of FIGURE 1.

FIGURE 7 is a fragmentary sectional view illustrating certain constructional details of the present invention and being taken on the line 7—7 of FIGURE 5.

Referring in detail to the drawings, the numeral 10 indicates a portion of a conventional vehicle such as an automobile, truck, bus or the like, and the vehicle 10 includes the usual chassis which embodies or comprises spaced apart side frame members 12 and 13, FIGURE 1, and the vehicle 10 is further provided with the usual front wheels 14. The numerals 15 and 16 indicate reach arms that are adapted to be connected to the usual spindles for the wheels 14. As shown in FIGURE 1, there is provided a tie rod assembly which is indicated generally by the numeral 17, and the tie rod assembly 17 embodies end members 18 that are connected as at 19 to the reach arms 15, and a crosspiece 20 connects the end members 18 together as at 21.

The numeral 22 indicates a generally U-shaped bracket which includes a flat portion 23 that is adapted to be secured to the inner surface of a side frame member 12 as at 24, and the bracket 22 further includes a pair of spaced parallel legs 25 that are arranged at right angles with respect to the flat portion 23. The numeral 26 indicates a shaft that is journaled in the legs 25, and a sheave or roller 27 is mounted on the shaft 26 and affixed thereto as for example by means of a key 30. The outer periphery of the shaft 27 is grooved as at 28, and the numeral 29 indicates an actuating cable which has a portion thereof arranged in engagement with the grooves 28 of the sheave 27. The numeral 31 indicates a clamp that is affixed to the sheave 27 by means of a securing element 32, and the clamp 31 helps maintain the cable connected to the sheave so that slippage of the cable on the sheave will be prevented. The numeral 33 indicates a steering column which is adapted to be connected to the shaft 26 as for example by means of a universal joint 34, and the upper end of the steering column 33 has the usual steering wheel 35 thereon, FIGURES 1 and 2.

As shown in FIGURES 1 and 6 for example, there is shown or provided a support member 36 which is generally L-shaped in cross section, and the support member 36 includes a first portion 37 that is secured as at 38 to the inner surface of the side frame member 13, and the support member 36 further includes a second portion 39 that is arranged at right angles with respect to the first portion 37. There is provided in the second portion 39 a plurality of spaced apart apertures or openings 40, and the numeral 41 indicates a bar that is adjustably connected to the portion 39 of the support member 36 as for example by means of pins or securing elements 42 and 45. The numeral 43 indicates a pulley which is journaled in the end portion of the bar 41 as at 44, and a portion of the cable 29 is arranged in engagement with the pulley 43. The securing element 45 is adapted to selectively engage one aperture 40 whereby the arm 41 can be held in different adjusted positions in order to help take up slack on the cable 29 in order to help maintain the proper amount of tension on the cable 29. The numeral 57 indicates generally the slack adjusting unit or mechanism that includes the support member 36.

As shown in FIGURES 1 and 4 for example, there is provided a cable tensioning unit or mechanism which is indicated generally by the numeral 58, and the cable tensioner 58 embodies a base piece 46 which comprises a flat first section 47 that is secured in any suitable manner to the side frame member 13, and the base piece 46 further includes a second section 48 that is arranged at right angles with respect to the section 47, and the base piece 46 further embodies a third section 49 that is arranged angularly with respect to the section 48, and the third section 49 of the base piece 46 is provided with a slot 50 for a purpose to be later described.

The mechanism 58 further embodies a yoke that is indicated generally by the numeral 51, and the yoke 51 includes a main straight portion 52 that is slidable or adjustable in the slot 50 of the third section 49, FIGURE 4, and the yoke 51 is further provided with a lip 53 on one end thereof, and a coil spring 56 is interposed between the lip 53 and the third section 49, and studs 54 and 55 engage opposite ends of the spring 56 so as to help maintain the parts in their proper aligned position.

Secured to or formed integral with the yoke 51 is a saddle section 59 that is generally L-shaped in cross section, and a pulley 60 is journaled between the saddle section 59 and the main straight portion 52 as at 61, and a portion of the cable 29 is arranged in engagement with the pulley 60.

As shown in FIGURE 1 one end of the cable 29 is anchored to the reach arm 16 as at 62. The numeral 63 indicates a spring mechanism for operatively connecting the other end of the cable 29 to the other reach arm 15, and as shown in FIGURE 3, the spring mechanism 63 embodies first and second interfitting body members 64 and 68 which generally have the same construction. Thus, the body member 64 includes a curved portion 65 on one end thereof which is adapted to engage an aperture or opening in the rear end of the reach arm 15, and there is provided outwardly disposed hooks 66 on the other end of the body member 64, and these hooks 66 are adapted to engage one end of a coil spring 67 that is circumposed on the body members 64 and 68. The other body member 68 includes a curved end portion 69 as well as oppositely arranged hook portions 70, and the hook portions 70 are adapted to engage a looped portion 71 on the end of the cable 29.

From the foregoing, it is apparent that there has been provided a steering mechanism which is especially suitable for use on a vehicle such as an automobile or the like, and in use with the parts arranged as shown in the drawings, it will be seen that by turning the steering wheel 35 in the usual manner, the shaft 26 will be turned or rotated due to the provision of the universal joint 34 which connects the shaft 26 to the steering column or shaft 33, and since the sheave 27 is keyed to the shaft 26 as a 30, it will be seen that this rotation of the shaft 26 will cause corresponding rotation or turning of the sheave 27. The shaft 26 is supported by or journaled in the ends of the legs 25 of the bracket 22, and the bracket 22 is adapted to have its portion 23 secured as at 24 to the inner surface of the side frame member 12. The intermediate portion of the cable 29 is firmly secured or affixed to the sheave 27 as for example by means of the clamp or retaining element 31 which is held in place by the securing element or bolt 32, FIGURE 5, and FIGURE 7. There is provided in the outer periphery of the sheave 27 grooves 28, and a portion of the cable 29 engages these grooves and these grooves thus help maintain the cable in its proper aligned position on the sheave. One end of the cable 29 is connected as at 62 to the reach arm 16, and the other end of the cable 29 is connected to the other reach arm 15 by means of the spring mechanism 63. This construction is such that as the sheave 27 is turned by the previously described construction, the cable 29 will be moved so that both of the reach arms 15 and 16 will be simultaneously moved since the ends of the cable are connected to the rear portions of the reach arms 15 and 16 as previously described. The reach arms 15 and 16 are adapted to be connected to the usual wheel spindles and as the reach arms 15 and 16 are shifted or moved back and forth, the front wheels 14 will be turned in the proper direction in order to guide or steer the vehicle.

The present invention also includes a means for taking up slack or maintaining proper tension on the cable 29, and the means includes the mechanism 58 which embodies the shiftable or adjustable yoke 51 that is urged or biased in the proper direction by means of the coil spring 56 so that with the cable 29 having a portion thereof engaging the pulley 60, it will be seen that the coil spring 56 will exert tension or pressure in the proper direction in order to cause the pulley 60 to help take up slack and maintain the cable 29 with the proper and desired degree of tension or tightness.

In addition the mechanism 63 also functions to help take up slack on the cable 29 and therefore help maintain the cable under the proper tension, and it will be seen that the mechanism 63 embodies the members 64 and 68 which are connected to the spring 67, and normally the spring 67 can or tends to expand in order to apply pressure or tension to the cable 29 in order to accomplish the desired result.

The mechanism 57 can be used for changing the amount of tension on the line or cable 29, as for example after the parts have been used for a certain period of time, some slack may appear in the cable 29, and when this occurs, the pin 45 can be disconnected from the arm 41 and from an opening 40 in the portion 39 of the support member 36, and then the bar 41 can be pivoted to the desired location on its pivot pin 42, and then the pin 45 can be reinserted through the bar 41 and through one of the apertures or openings 40 in order to maintain the bar 41 in its proper location. This shifting movement of the bar will cause corresponding shifting movement of the pulley 43 so that any slack in the cable 29 can be eliminated or compensated therefor.

The parts can be made of any suitable material and in different shapes or sizes.

The clamp or bracket 31 prevents the cable 29 from slipping in the groove 28 of the sheave 27. Only one elongated cable 29 is used to provide a means of transmitting motion or connecting the sheave or drum 27 to the arms 15 and 16 in order to turn the wheel 14 as the steering wheel 35 is rotated manually. The present invention embodies a rugged and simple construction and the present invention can be used in conjunction with other mechanisms besides steering mechanisms of vehicles. As the sheave 27 rotates, the cable on one end is wound up on the sheave while at the same time the cable on the other end of the sheave is unwound or unrolled. The idler wheels or pulleys 43 and 60 in conjunction with the mechanism 63 serves to take up slack in the line or cable.

Although the invention herein described is fully capable of achieving the objects and providing the advantages hereinbefore mentioned, it is to be understood that it is merely illustrative of the presently preferred embodiment of the invention and that it is not to be limited to the details of construction herein described other than as defined in the appended claim.

What is claimed is:

In a vehicle, a chassis including first and second side frame members, front wheels connected to said chassis, first and second reach arms for said wheels, a tie rod assembly connected to said arms and including end members and a crosspiece, a U-shaped bracket embodying a flat portion secured to the inner surface of the first side frame member, said bracket further including a pair of spaced parallel legs arranged at right angles with respect to said flat portion, a shaft journaled in the ends of the legs, a steering column having one of its ends operatively connected to the shaft through the medium of a universal joint, said column having a steering wheel on its upper end, a sheave affixed to said shaft and said sheave being interposed between said legs, there being grooves in the outer periphery of said sheave, a cable trained around said sheave and engaging said grooves, a clamp engaging said cable and affixed to said sheave, an L-shaped support member embodying a first portion secured to the inner surface of the second side frame member, said support member further including a second portion arranged at right angles with respect to said first portion, a bar adjustably connected to the second portion of the support member, a first pulley journaled on said bar and having said cable arranged in engagement therewith; a base piece including a flat first section secured to said second side frame member, said base piece further including a second section arranged at right angles with respect to said first section, a third section arranged at right angles with respect to said second section, there being a slot in said third section, a yoke including a main straight portion slidably and adjustably arranged in the slot in the third section, a lip on an end of said yoke, studs operatively connected to said lip and to the third section of said base piece, a coil spring having its ends engaging said studs, an L-shaped saddle section affixed to the straight portion of said yoke, a pulley journaled between said saddle section and said main straight portion and said last named pulley having a portion of the cable arranged in engagement therewith, one end of the cable being connected to the rear portion of the second reach arm, and a spring mechanism connecting the other end of the cable to the first reach arm.

References Cited in the file of this patent

UNITED STATES PATENTS

| | | |
|---|---|---|
| 622,329 | Crafts | Apr. 4, 1899 |
| 917,684 | Van Nort | Apr. 6, 1909 |
| 1,609,804 | Evans | Dec. 7, 1926 |
| 1,620,237 | Schroder | Mar. 8, 1927 |
| 2,920,361 | Michalowski et al. | Jan. 12, 1960 |